(12) United States Patent
Hasegawa (10) Patent No.: US 7,715,422 B2
(45) Date of Patent: May 11, 2010

(54) HALF-DUPLEX RADIO COMMUNICATION METHOD, PROGRAM AND SYSTEM THEREOF

(75) Inventor: Naoki Hasegawa, Tokyo (JP)

(73) Assignee: NEC Corporation (JP)

( * ) Notice: Subject to any disclaimer, the term of this patent is extended or adjusted under 35 U.S.C. 154(b) by 760 days.

(21) Appl. No.: 11/047,244

(22) Filed: Jan. 31, 2005

(65) Prior Publication Data

US 2006/0171389 A1     Aug. 3, 2006

(30) Foreign Application Priority Data

Jan. 29, 2004    (JP)    ............... 2004-020967

(51) Int. Cl.
  H04J 3/26      (2006.01)
  H04J 3/24      (2006.01)
  H04L 12/16     (2006.01)
  H04H 20/71     (2008.01)
  H04W 4/00      (2009.01)
  H04W 24/00     (2009.01)
  H04B 7/00      (2006.01)

(52) U.S. Cl. .............. 370/432; 370/270; 370/312; 370/328; 370/473; 455/456.3; 455/519

(58) Field of Classification Search ............ 370/390, 370/432, 276, 277, 401, 444, 379; 455/404.2, 455/519
See application file for complete search history.

(56) References Cited

U.S. PATENT DOCUMENTS

| | | | |
|---|---|---|---|
| 5,493,286 A | 2/1996 | Grube et al. | |
| 5,987,331 A | 11/1999 | Grube et al. | |
| 6,873,854 B2 * | 3/2005 | Crockett et al. | 455/518 |
| 7,023,813 B2 * | 4/2006 | Newberg et al. | 370/312 |
| 7,085,365 B2 * | 8/2006 | Kauppinen | 379/202.01 |

(Continued)

FOREIGN PATENT DOCUMENTS

DE       195 37 101       4/1997

(Continued)

OTHER PUBLICATIONS

Nokia Press Release: Nokia introduces a TETRA network based location solution for professional use; Global Communications Department, Nokia Networks; Nov. 18, 2002.*

(Continued)

*Primary Examiner*—Daniel J Ryman
*Assistant Examiner*—Cassandra Decker
(74) *Attorney, Agent, or Firm*—Ostrolenk Faber LLP (57) ABSTRACT

A half-duplex radio communication method, a program and a system enabling multicasting, for example, in an emergency for radio communication terminals belonging to different carrier systems if they meet designated condition while saving an operator the bother of inputting destinations. After accepting an application for emergency multicasting, a CUG server requests a presence server to search for data of radio communication terminals meeting the positional condition designated by a sender and receives the data. In this operation, the CUG server searches a present state table in the presence server, picks up user information of the radio communication terminals as the destinations of the emergency multicasts, based on the positional information. Then, a CUG is formed based on the picked up user information and registered as the CUG for the emergency multicasting.

16 Claims, 8 Drawing Sheets

U.S. PATENT DOCUMENTS

| | | | |
|---|---|---|---|
| 7,197,034 B2 * | 3/2007 | Muhonen | 370/392 |
| 2002/0150091 A1 * | 10/2002 | Lopponen et al. | 370/389 |
| 2003/0053434 A1 | 3/2003 | Chow et al. | |
| 2003/0187926 A1 * | 10/2003 | Karjanlahti | 709/204 |
| 2003/0235184 A1 | 12/2003 | Dorenbosch et al. | |
| 2004/0098455 A1 * | 5/2004 | Ellis et al. | 709/204 |
| 2004/0190468 A1 * | 9/2004 | Saijonmaa | 370/312 |
| 2005/0113123 A1 * | 5/2005 | Torvinen | 455/519 |
| 2005/0133123 A1 * | 6/2005 | Joseph et al. | 148/437 |
| 2005/0276268 A1 * | 12/2005 | Poikselka et al. | 370/395.2 |

FOREIGN PATENT DOCUMENTS

| | | |
|---|---|---|
| JP | 60-180253 | 9/1985 |
| JP | 10-200521 | 7/1998 |
| JP | 2001-36645 | 2/2001 |
| JP | 2001-189704 | 7/2001 |
| WO | WO 03/105503 A1 | 12/2003 |

OTHER PUBLICATIONS

Office Action issued by Japanese Patent Office on Jul. 18, 2006 in connection with corresponding Japanese application No. 2004-020967.

English translation of Japanese Office Action dated Jul. 18, 2006 issued in connection with corresponding Japanese application No. 2004-020967.

European Search Report of Application No. EP 05001836, mailed Aug. 8, 2008 (3 pages).

\* cited by examiner

DISPLAY ALTERNATELY EVERY FEW SECONDS

F I G. 12B

HALF-DUPLEX RADIO COMMUNICATION METHOD, PROGRAM AND SYSTEM THEREOF

BACKGROUND OF THE INVENTION

1. Field of the Invention

The present invention relates to a half-duplex radio communication method, a program and a system for establishing half-duplex radio communication between radio communication terminals.

2. Description of the Prior Art

A conventional half-duplex radio communication system is comprised of carrier systems (communication control systems) managed by carriers, connected with each other. Each carrier system is provided with a CUG (Closed User Group) server.

For the establishment of half-duplex radio communication, a user needs a previous member entry from a PC (Personal Computer) or the like, and a CUG of radio communication terminals belonging to a carrier system is registered with the CUG server. After the registration of the CUG, half-duplex radio communication becomes possible within the CUG.

As the prior art of the carrier system, the Japanese Patent Application laid open No. 2000-244508 discloses a system in which an operator inputs information to a user interface part, and a node information database maintains the information on connected nodes with a CUG number as a key. Then, the entries in a routing table of all nodes corresponding to the CUG and the nodes to which the additional members are connected are set based on the CUG number, member information and node information.

However, in the conventional half-duplex radio communication system described above, the user interfaces and the operating procedures to perform the functions differ depending on the respective carrier systems. Further, an access to a CUG between different carrier systems is not generally allowed from a point of view of privacy protection, and therefore, it is not possible to establish radio communication between different carrier systems.

As a result, there has been a problem in that even if, for example, the police station or the fire station tries to perform emergency multicasting, it is not possible to send emergency multicasts to the systems of different carriers.

Besides, although the system disclosed in the patent application described above spares an operator the trouble of correcting and setting routing information, the operator needs to input, from the user interface part, information on members to be added to the CUG and the like. Further, the system still has the problem described above.

SUMMARY OF THE INVENTION

It is therefore an object of the present invention to provide a half-duplex radio communication method, a program, and a system enabling emergency multicasting for radio communication terminals which satisfy the specified conditions, even if the terminals belong to different carrier systems, while saving an operator the trouble of inputting destination addresses and the like.

To achieve the object mentioned above, according to the first aspect of the present invention, there is provided a half-duplex communication method comprising the steps of accepting an application from a sender terminal for multicasting data to radio communication terminals whose present state meets a designated condition, and multicasting data from the sender terminal to a plurality of communication control systems and the radio communication terminals whose present state meets a designated condition and belonging to the respective communication control systems.

Preferably, the present state is the positional condition of the respective radio communication terminals.

In the multicasting step, it is desirable that a CUG be formed of the radio communication terminals whose present state meets a designated condition and belonging to the respective communication control systems, and the sender terminal multicast data to the radio communication terminals registered to the CUG.

Preferably, in the multicasting step, the radio communication terminals whose present state meets the designated condition are retrieved from all of those being communicable and registered in advance with the respective communication control systems to form a CUG, and the sender terminal can acquire the right in half-duplex radio communication to send emergency multicasts to the radio communication terminals registered in the CUG, even if the radio communication terminals belong to the communication control systems other than the one to which the sender terminal belongs.

Preferably, the data for multicasting includes voice and pictures.

According to the second aspect of the present invention, there is provided a half-duplex radio communication program for making a computer perform the processes of accepting an application from a sender terminal for multicasting data to radio communication terminals whose present state meets a designated condition, and multicasting data from the sender terminal to a plurality of communication control systems and the radio communication terminals whose present state meets a designated condition and belonging to the respective communication control systems.

It is desirable that the present state be the positional condition of the respective radio communication terminals.

In the multicasting step, it is desirable that a CUG be formed of the terminals whose present state meets a designated condition and belonging to the respective communication control systems, and the sender terminal multicast data to the radio communication terminals registered to the CUG.

Preferably, in the multicasting step, the radio communication terminals whose present state meets the designated condition are retrieved from all of those being communicable and registered in advance with the respective communication control systems to form a CUG, and the sender terminal can acquire the right in half-duplex radio communication to send emergency multicasts to the radio communication terminals registered in the CUG, even if the radio communication terminals belong to the communication control systems other than the one to which the sender terminal belongs.

Preferably, the data for multicasting includes voice and pictures.

According to the third aspect of the present invention, there is provided a half-duplex radio communication system comprising a plurality of communication control systems connected with each other, each including a radio communication controller for controlling half-duplex radio communication and a present state acquisition section for acquiring information about the present states of radio communication terminals belonging to the communication control system. When the radio communication controller accepts an application for multicasting data to the radio communication terminals whose present state meets a designated condition, data are multicasted to the radio communication terminals whose present state meets a designated condition based on the information about the present states of the radio communication terminals retained by the respective present state acquisition sections of the plural communication control systems under the control of the radio communication controller.

It is desirable that the present state be the positional conditions of the radio communication terminals, and the present state acquisition section, as a positional information acquisition section, acquire information about the positional conditions of the respective radio communication terminals belonging to the communication control systems each including the positional information acquisition section.

It is desirable that after accepting the application for multicasting, the radio communication controller form a CUG from the radio communication terminals meeting a designated positional condition based on the positional information of the respective radio communication terminals from the positional information acquisition section, and multicast data from a sender terminal to the radio communication terminals registered to the CUG.

Preferably, the radio communication controller, after accepting the application for multicasting, requests the positional information acquisition sections of the communication control systems to retrieve the radio communication terminals whose present state meets the designated condition from all of those being communicable and registered in advance with the communication control systems to form a CUG, and the sender terminal can acquire the right in half-duplex radio communication to send emergency multicasts to the radio communication terminals registered in the CUG, even if the radio communication terminals belong to the communication control systems other than the one to which the sender terminal belongs.

It is desirable that the data for multicasting include voice and pictures.

BRIEF DESCRIPTION OF THE DRAWINGS

The above and further objects and novel features of the invention will be more fully understood from the following detailed description when the same is read in connection with the accompanying drawings in which:

FIG. 12 (a) is a diagram showing an example of a display for receiving the emergency multicast as an image; and FIG. 12 (b) is a diagram showing an example of a display for receiving the emergency multicast as an image.

DETAILED DESCRIPTION OF THE PREFERRED EMBODIMENT

A half-duplex radio communication method, a program and a system in accordance with a preferred embodiment of the present invention will be described in detail with reference to the accompanying drawings.

A half-duplex radio communication system of this embodiment in which excellent radio communication is possible in respective carrier systems (communication control systems) in normal use and it is also possible to send data to radio communication terminals belonging to the different carrier systems in emergency multicasting.

Figure 1:
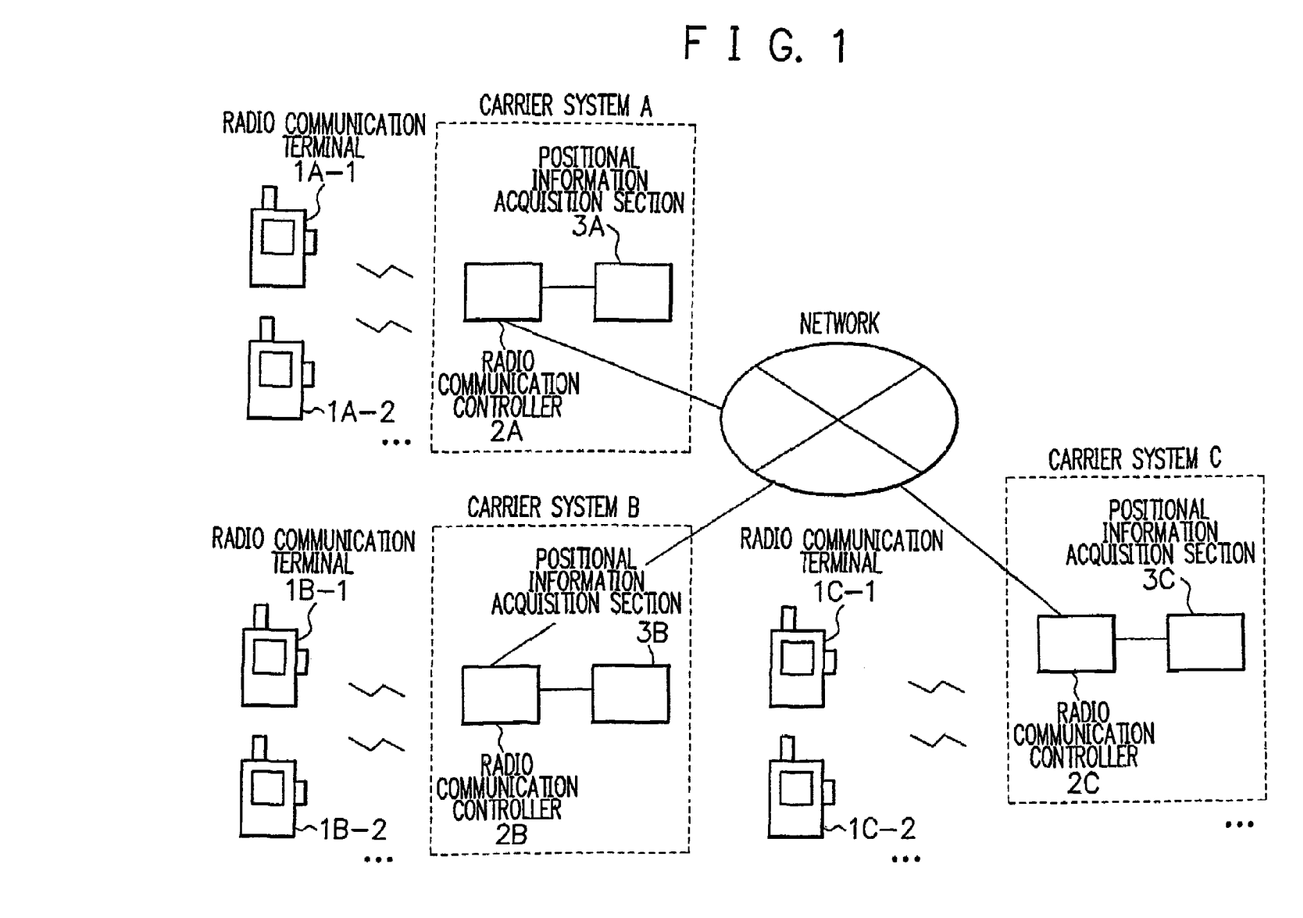
FIG. 1 is a block diagram schematically showing a half-duplex radio communication system and radio communication terminals 1 belonging to each system according to an embodiment of the present invention.

FIG. 1 is a block diagram showing the half-duplex radio communication system and radio communication terminals 1 belonging to each system according to this embodiment. As shown in FIG. 1, the half-duplex radio communication system of the embodiment comprises a plurality of carrier systems (A, B, C, . . . ) connected with each other via a network.

Each carrier system is provided with a radio communication controller 2 and a positional information acquisition section 3. The radio communication controller 2 controls the half-duplex radio communication between the radio communication terminals 1 belonging to the carrier systems, respectively.

Incidentally, the radio communication terminal belonging to the carrier system is the terminal registered in advance with the carrier system and capable of establishing half-duplex radio communication by using the carrier system.

The radio communication controller 2 of each carrier system does not allow normal communication between the radio communication terminal 1 belonging to its own carrier system and that belonging to another system. In other words, customer information of its own system such as information about CUGs is protected against the other carrier systems.

Accordingly, the leak of personal information is prevented among respective carrier systems.

By registering the radio communication terminals belonging to one carrier system for half-duplex radio communication, it is possible to establish half-duplex radio communication between the radio communication terminals belonging to the carrier system.

Figure 2:
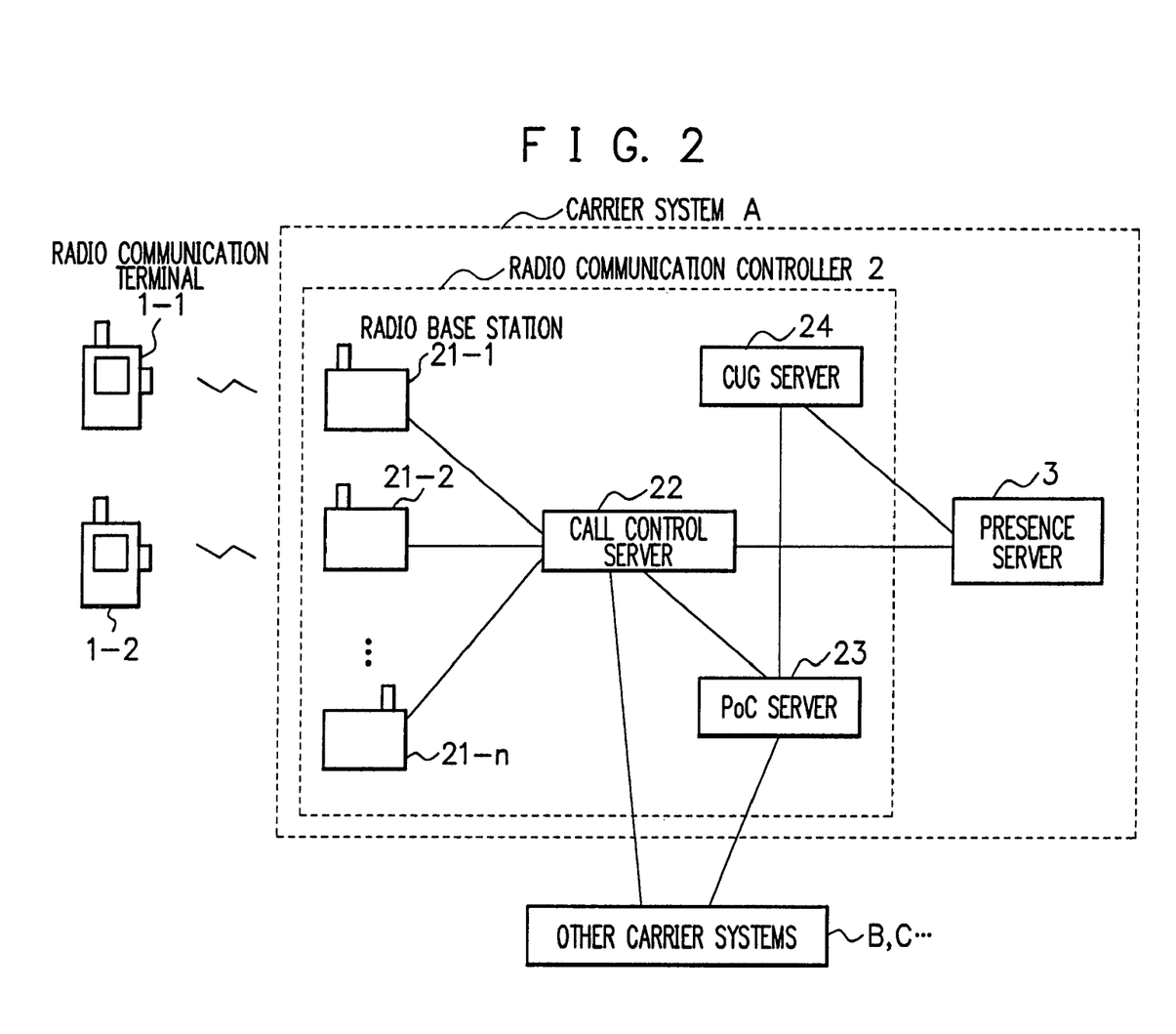
FIG. 2 is a block diagram schematically showing the structure of a carrier system.

FIG. 2 is a block diagram showing the structure of the carrier system. As shown in FIG. 2, each carrier system is provided with radio base stations 21 (21-1, 21-2, . . . ), a call control server 22, a PoC (Push to talk Over Cellular) server 23, a CUG server 24 as the radio communication controller 2 and a presence server 3 as the positional information acquisition section 3.

The call control server 22 and the PoC server 23, which are connected to the other carrier systems, control half-duplex radio communication based on information about CUG transmitted from the CUG server 24.

Further, each device stores a program (not shown) in a memory and operates under the control based on the program.

Figure 3:
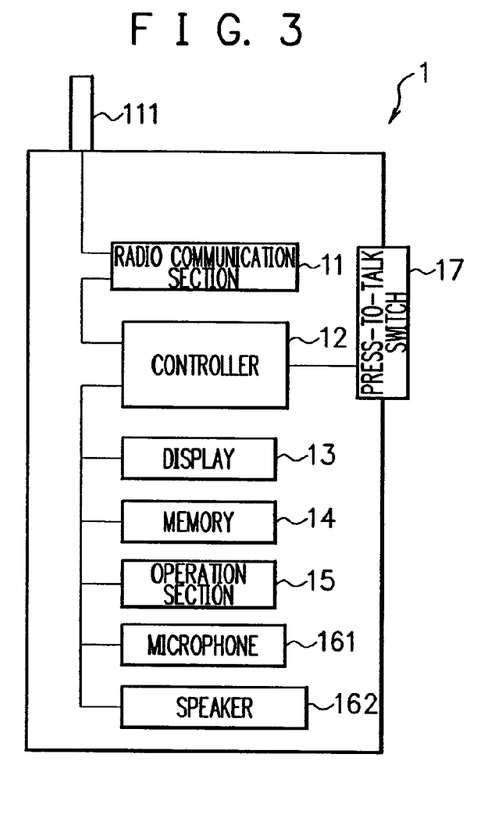
FIG. 3 is a block diagram schematically showing the structure of the radio communication terminal 1.

FIG. 3 is a block diagram showing the structure of the radio communication terminal 1. As shown in FIG. 3, the radio communication terminal 1 is provided with a radio communication section 11, a controller 12, a display 13, a memory 14, an operation section 15, a microphone (voice transmitter)

161, a speaker (voice receiver) 162, a press-to-talk switch 17 and an antenna 111 connected to the radio communication section 11.

The radio communication section 11 performs signal processing or the like concerning radio communication through the antenna 111 and controls radio communication.

The controller 12 controls the whole radio communication terminal 1.

The display 13 informs a user of various information necessary for establishing radio communication.

The memory 14 stores information for identifying the other radio communication terminals 1 in the configured CUG, the address of the CUG server 24 or the like.

The operation section 15 is used by the user to provide input to operate the radio communication terminals 1 as for example when he/she changes the display mode of the display 13.

Because the radio communication terminals 1 employ a half-duplex radio communication method for performing radio communication, when a user transmits voice from the radio communication terminal 1 to the other radio communication terminals 1 registered in advance to the same CUG, the press-to-talk switch is pressed to transmit the voice and voice is received by the microphone 161 and transmitted to the other radio communication terminals 1 registered as the members of the CUG.

When the press-to-talk switch is not pressed, voice from the other radio communication terminal 1 of the CUG is received and emitted from the speaker 162.

The radio base stations 21 (21-1, 21-2, . . . ) establish half-duplex radio communication between the radio communication terminals 1, and transmits and receives correspondence data to/from the call control server 22.

Figure 4:
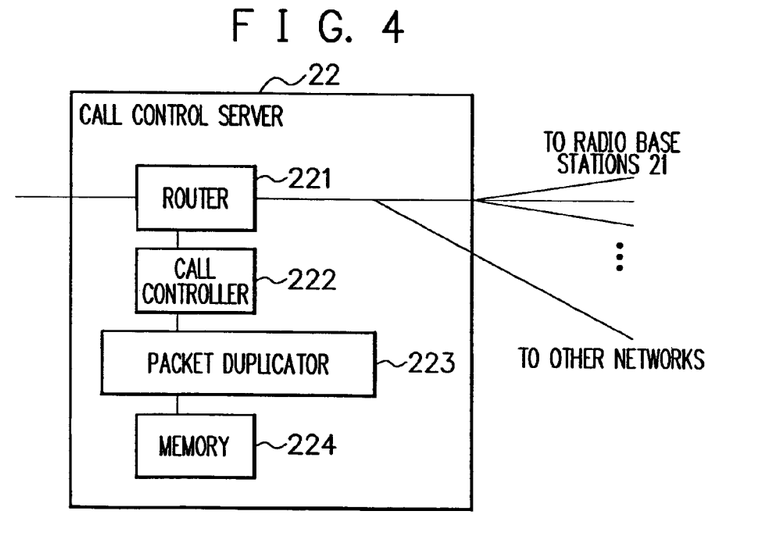
FIG. 4 is a block diagram schematically showing the structure of a call control server 22.

FIG. 4 is a block diagram showing the structure of the call control server 22. As shown in FIG. 4, the call control server 22 is provided with a router 221, a call controller 222, a packet duplicator 223, and a memory 224. The router 221 is connected to the respective radio base stations 21 and the other carrier systems or a network such as the Internet.

Figure 5:
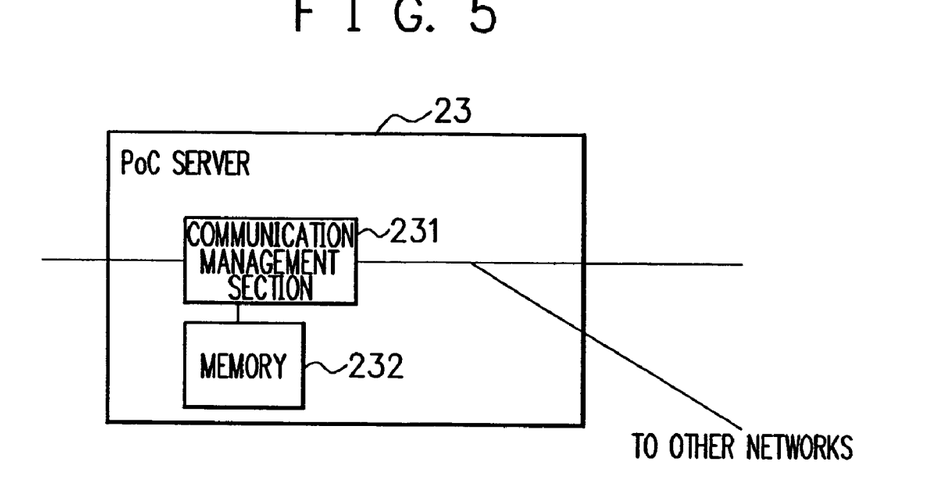
FIG. 5 is a block diagram schematically showing the structure of a PoC server 23.

FIG. 5 is a block diagram showing the structure of the PoC server 23. As shown in FIG. 5, the PoC server 23 is provided with a communication management section 231 and a memory 232.

The communication management section 231 manages, based on information as to users included in a CUG from the CUG server 24, the communication of the call control server 22 with the half-duplex radio communication terminals. The memory 232 stores information such as CUG data (a table of information on users included in a CUG) transmitted from the CUG server 24 when the communication management section 231 manages half-duplex radio communication.

Because the call control server 22 and the PoC server 23 have the structures as described above, with respect to communication with the respective base stations 21 connected by the router 221, the call controller 222 and the communication management section 231 control the connection based on the authentication result provided by the CUG server 24. In order to send data transmitted from the radio communication terminal 1 to the other radio communication terminals 1 registered as the CUG, the packet duplicator 31 duplicates a transmitted data packet and makes the necessary number of its copies, and the router 32 transmits the duplicated packets to the base station 2 to which belong the radio communication terminals 1, the destinations.

The CUG server 24 stores information about registered CUGs. Having received a connection request from the radio communication terminal 1, the CUG server 24 authenticates the terminal 1 to determine whether or not to permit the connection. When permitting the connection, the CUG server 24 transmits information about a CUG including the radio communication terminal 1 to the PoC server 23.

Figure 6:
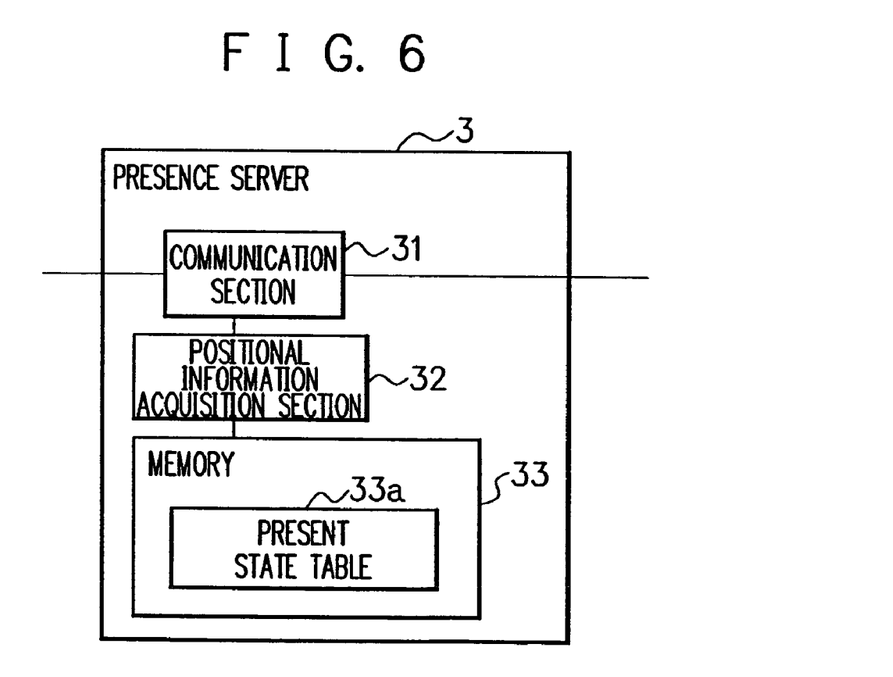
FIG. 6 is a block diagram schematically showing the structure of a presence server 3.

FIG. 6 is a block diagram showing the structure of the presence server 3. As shown in FIG. 6, the presence server 3 is provided with a communication section 31, a positional information acquisition section 32 and a memory 33 storing a present state table 33a.

The positional information acquisition section 32 acquires information on the current positions of the radio communication terminals 1 belonging to the carrier system including the positional information acquisition section. The positional information acquisition section 32 may acquire the positional information always or at regular intervals.

The present state table 33a stores information on the present state of the respective radio communication terminals 1, including the positional information, acquired by the positional information acquisition section 32 in association with the names of users of the terminals 1.

Incidentally, the present state described above may be identified by the positional information acquisition section 32 with a predetermined identification method or the other various methods.

In the case that the radio communication controller 2 cannot communicate with the radio communication terminal 1 because, for example, the terminal 1 is off or far away from the base stations, it is not possible to acquire the information about the present state of the terminal 1. Therefore, in that case, the present state table 33a may store as the present state the latest information among information about the present state of the radio communication terminal 1 already acquired.

Figure 7:
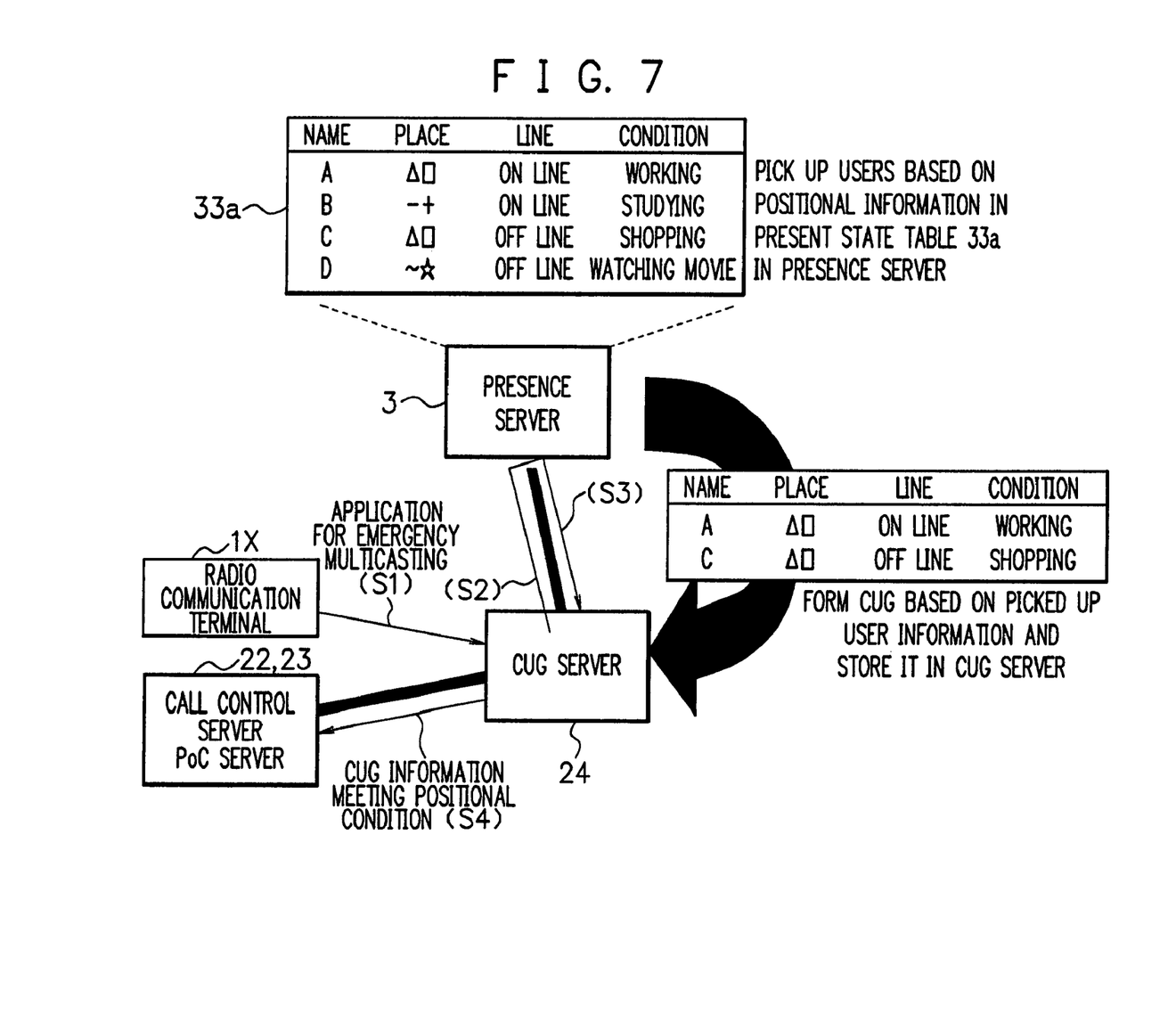
FIG. 7 is a diagram for explaining CUG formation and registration operation for emergency multicasting in a half-duplex radio communication system of the embodiment.
Figure 8:
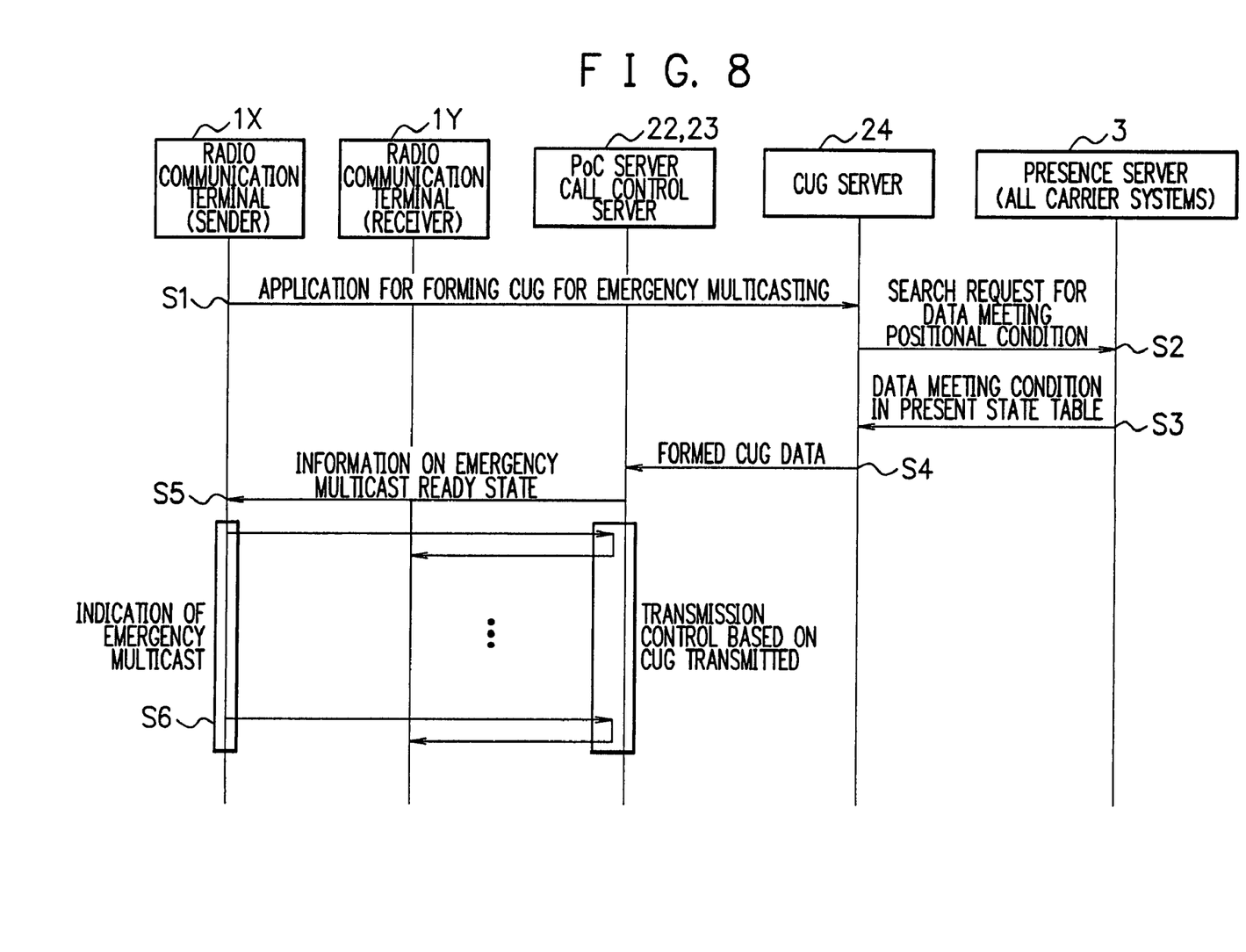
FIG. 8 is a sequence chart showing the operation of the half-duplex radio communication system for emergency multicasting.

Next, a description will be given of the operation of the half-duplex radio communication system of this embodiment for emergency multicasting referring to FIGS. 7 and 8. FIG. 7 is a conceptual diagram showing CUG formation and registration operation for performing emergency multicasting, and FIG. 8 is a sequence chart showing the whole operation of the emergency multicasting.

Here, in emergency multicasting, a CUG is formed of the radio communication terminals 1 meeting the designated condition, and multicasts are sent to the radio communication terminals 1 in the CUG if an emergency arises. In this embodiment, the CUG for emergency multicast is formed of the radio communication terminals 1 including the ones belonging to the other carrier systems.

A sender who wants to send emergency multicasts applies to the CUG server 24 for emergency multicasting from his/her radio communication terminal 1 (step S1). In FIGS. 7 and 8, the radio communication terminal of this sender is denoted by 1X.

Figure 9:
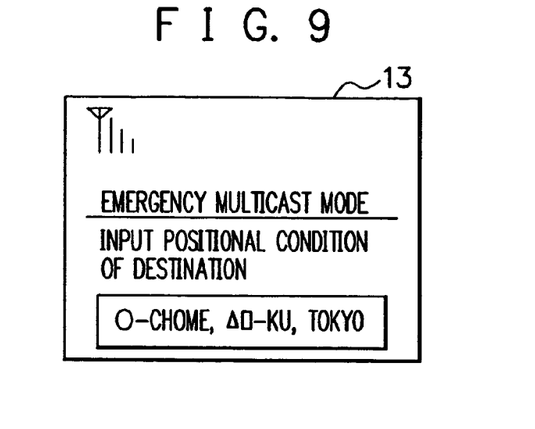
FIG. 9 is a diagram showing an example of a display when the emergency multicast mode is chosen.

To apply for emergency multicasting, the sender chooses an emergency multicasting mode on his/her own the radio communication terminal 1X (sender terminal). From the display indicating the emergency multicasting mode as shown in FIG. 9, the sender inputs the positional condition to narrow down the radio communication terminals 1 to transmit emergency multicasts.

After accepting the application for emergency multicasting, the CUG server 24 requests the presence server 3 to search for data of the radio communication terminals 1 meeting the positional condition (step S2), and then receives the data of the radio communication terminals 1 meeting the positional condition (step S3).

Between steps S2 and S3, the CUG server 24 searches the present state table 33a of the presence server 3, picks up the user information of the radio communication terminals 1 as destinations of the emergency multicasts applied based on the positional condition, forms a CUG based on the user information, and registers the CUG for the emergency multicasting applied.

Referring to FIG. 7, the present state table 33a shows, as exemplified, users' names in association with places (positional information), line connectibilities (ON LINE/OFF LINE) and the users' conditions.

The information associated with respective users' names is, as described above, updated always or every designated times when the radio communication terminal is connectable (ON LINE), and the latest information when the terminal 1 is not connectable (OFF LINE).

Moreover, between steps S2 and S3, the CUG server 24 which has received the application for emergency multicasting requests the presence servers 3 of the carrier systems to search the data of all the radio communication terminals being communicable and registered in advance with the respective systems, to retrieve the radio communication terminals 1 meeting the designated positional condition from among the radio communication terminals 1 belonging to the carrier systems.

Consequently, it is possible to form a CUG for emergency multicasting including the radio communication terminals 1 belonging to different carrier systems and send emergency multicasts to more radio communication terminals meeting the designated positional condition.

After the CUG for emergency multicasting is formed, the CUG server 24 transmits the CUG data to the PoC server 23 (step S4). The PoC server 24 and the call control server 22 inform the radio communication terminal 1X that emergency multicast transmission becomes possible (step S5).

Figure 10:
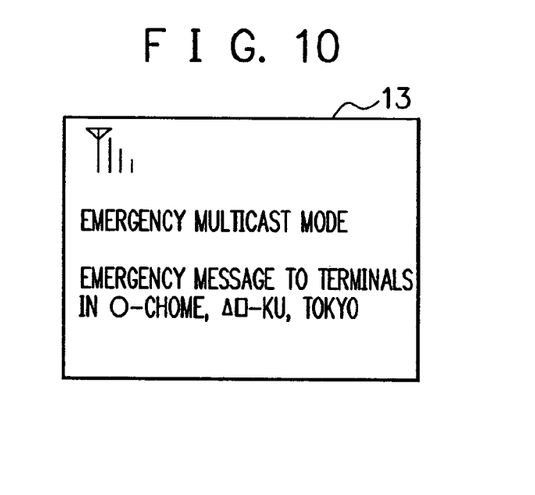
FIG. 10 is a diagram showing an example of a display for sending emergency multicasts.

Having received the information, the radio communication terminal 1X displays on the display 13, for example, a screen image as shown in FIG. 10 to inform the user that emergency multicast transmission becomes possible.

After emergency multicast transmission becomes possible, the radio communication terminals 1Y (1Y-1, 1Y-2, . . . ) which have been designated as receivers because they fit the positional condition are forced to be in a receiving state as long as they are ON LINE and receive vocal data or the like from the radio communication terminal 1X while the sender is pressing the press-to-talk switch 17 of the radio communication terminal 1X (step S6).

Hereinafter, a description will be given of the operation for receiving data in the case, for example, where a sender is a police officer in charge.

Figure 11:
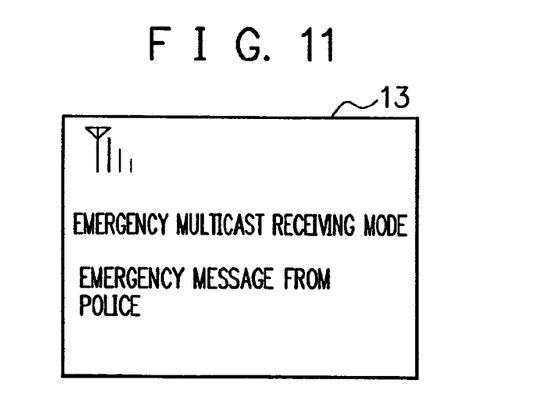
FIG. 11 is a diagram showing an example of a display for receiving the emergency multicast.

The radio communication terminals 1Y as receivers belonging to the respective carriers, as long as they are ON LINE, display a screen image as shown in FIG. 11 on the display 13 and output the voice of the sender from the speaker 162.

In other words, the radio communication terminals 1X, which has applied for emergency multicasting forcibly acquires the right to speak in the half-duplex radio communication.

Figure 12A:
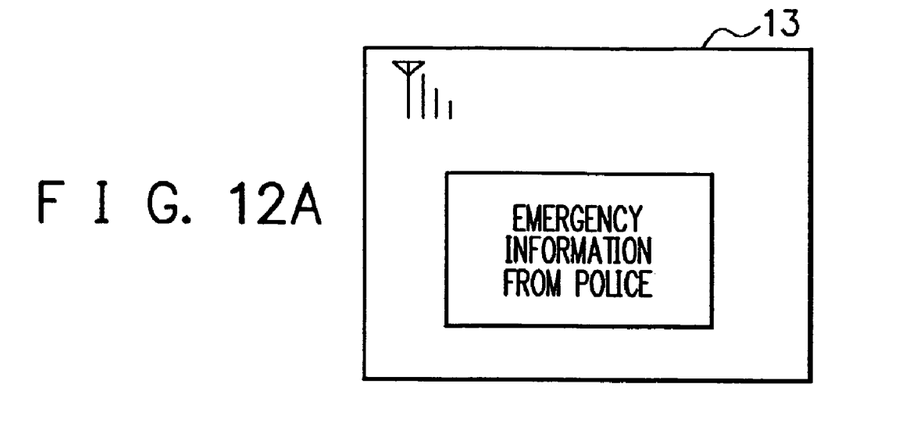
Figure 12B:
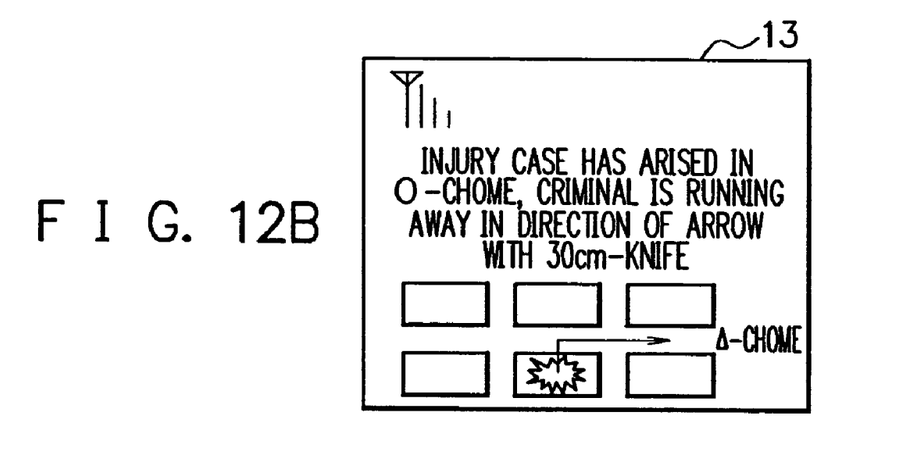

FIGS. 12 (a) and 12 (b) are diagrams showing examples of displays for receiving image data as an emergency multicast from the radio communication terminal 1X of the sender. In FIG. 12, the radio communication terminal 1Y, the receiver, indicates displays as shown in FIGS. 12 (a) and 12 (b) on the display 13 alternately every couple of seconds.

By such image data, it is possible to perform emergency multicasting without bothering the user having the radio communication terminal 1Y, the receiver, with an unexpected voice output when the user is under circumstances where it is undesirable to make noise.

On the other hand, voice data and image data may be sent together as an emergency multicast. That makes it easier for receivers to understand information.

As above, in the half-duplex radio communication system according to this embodiment, when an emergency arises, it is possible to send multicasts from a sender to the radio communication terminals 1Y belonging to a plurality of the carrier systems.

The radio communication terminals 1Y as receivers, can be general radio communication terminals, which do not need any special functions. Accordingly, it is possible to multicast data to all the radio communication terminals registered in advance with the carrier systems, meeting the designated condition and being ON LINE by the half-duplex radio communication in which a sender terminal has the right to speak.

For example, urgent information can be sent from the police station or the fire station by employing the half-duplex radio communication system.

While a preferred embodiment of the present invention has been described, it is possible to make changes and variations without departing from the spirit or scope of the present invention.

As far as the functions of the present invention can be implemented, the respective servers in the system are not limited to those described above. For example, one server may provide the functions of the plural servers in the embodiment or the function of one server in the embodiment may be implemented by a plurality of devices.

Further, the operation and the screen displays are given only as examples, and they can be changed or modified as far as the functions of the present invention can be implemented.

For instance, while the positional information to apply for emergency multicasting is designated by inputting an address in the above description, it is not limited to that and it is possible to employ the other methods if it is possible to designate the area.

In the embodiments described above, the sender designates the positional condition when applying for emergency multicasting, the CUG server 24, which has accepted the application picks up users meeting the positional condition from the present state table 33a and forms a CUG for emergency multicasting. Further, the line condition being ON LINE may be added to the condition for picking up.

Accordingly, it is possible to form a CUG by picking up with high precision the users who are currently in the designated area for emergency multicasting.

In other words, it is possible to multicast data by picking up only the users who are in the area at the moment allowing for the possibility that some users have moved while the presence server 3 cannot update the positional information because the radio communication terminals are in OFF LINE state.

The search condition designated by the sender applying for emergency multicasting is not limited to the positional condition but also the other information as far as it indicates the present states of the radio communication terminals stored in the present state table 33a.

In this case, in the operations from step S2 to S3 described above, the CUG is formed based on user information corresponding to information indicating designated present state in the respective carrier systems and the systems are controlled to establish half-duplex radio communication as multicasting to the radio communication terminals 1Y included in the CUG.

In the embodiments described above, while the programs are stored in the memories of the respective devices, the storage device is not limited to the memory as far as it is a computer-readable recording medium. For instance, the programs may be stored in a ROM (Read Only Memory), a hard disk, a floppy ® disk, an optical disk, a magnetic optical disk, a CD-ROM (Compact Disk Read Only Memory), a CD-R (Compact Disk Recordable), an electromagnetic tape, a non-volatile memory card, an EEPROM (Electronically Erasable and Programmable Read Only Memory), or the like.

The functions of the embodiment of the present invention described above may be implemented by respective programs provided from the recording medium as referred to above for making a CPU (Central Processing Section) of a computer, etc. perform the process.

In that case, the information including the programs may be provided from the recording medium or an external recording medium through a network to an output device.

In other words, the program code itself read out from the recording medium implements the novel functions of the present invention and the recording medium storing the program code and signals read out from the recording medium comprise the present invention.

The programs according to the present invention enables a computer to realize the functions previously described for the embodiment in the half-duplex radio communication system.

As set forth hereinabove, in accordance with the present invention, it is possible to perform multicasting, for example, in an emergency even for radio communication terminals belonging to different carrier systems if they meet designated condition while saving an operator the bother of inputting destinations.

While a preferred embodiment of the present invention has been described using specific terms, the description has been for illustrative purpose only, and it is to be understood that changes and variations may be made without departing from the spirit or scope of the following claims.

What is claimed is:

1. A half-duplex radio communication method comprising:
    accepting an application from a sender terminal for multicasting data to a multicast group formed from each terminal of first radio communication terminals belonging to a first cellular network and second radio communication terminals belonging to a second cellular network whose present state meets a designated condition;
    automatically registering the present state of each terminal of the first radio communication terminals of the first cellular network and the second radio communication terminals of the second cellular network; and
    multicasting data from the sender terminal to the multicast group formed from each terminal of the first radio communication terminals of the first cellular network and the second radio communication terminals of the second cellular network when the present state of the respective terminal meets the designated condition,
    wherein the present state is a positional condition of each respective radio communication terminal,
    wherein the second cellular network is different from the first cellular network, and
    wherein forming the multicast group from each terminal of first radio communication terminals belonging to a first cellular network and second radio communication terminals belonging to a second cellular network whose present state meets a designated condition is based only on the positional condition of each respective radio communication terminal meeting the designated condition.

2. The half-duplex radio communication method claimed in claim 1, wherein, in the multicasting step, a closed user group is formed of the first radio communication terminals and the second radio communication terminals whose present state meets the designated condition and the sender terminal multicasts data to the radio communication terminals registered to the closed user group.

3. The half-duplex radio communication method claimed in claim 2, wherein, in the multicasting step, the present state of each radio communication terminal of the first radio communication terminals and the second radio communication terminals whose present state meets the designated condition is retrieved from all communicable terminals of the first cellular network and the second cellular network and registered in advance with a respective cellular network of the respective terminal to form the closed user group, and the sender terminal acquires a right in half-duplex radio communication to send emergency multicasts to the radio communication terminals registered in the closed user group, even when the radio communication terminals belong to cellular networks other than the cellular network to which the sender terminal belongs.

4. The half-duplex radio communication method claimed in claim 2, wherein the data for multicasting includes voice and pictures.

5. The half-duplex radio communication method claimed in claim 1, wherein the data for multicasting includes voice and pictures.

6. A tangible processor-readable medium incorporating a half-duplex radio communication program for making a computer perform the processes of:
    accepting an application from a sender terminal for multicasting data to a multicast group formed from each terminal of first radio communication terminals belonging to a first cellular network and second radio communication terminals belonging to a second cellular network whose present state meets a designated condition;
    automatically acquiring the present state of each terminal of the first radio communication terminals of the first cellular network and the second radio communication terminals of the second cellular network; and
    multicasting data from the sender terminal to the multicast group formed from each terminal of the first radio communication terminals of the first cellular network and the second radio communication terminals of the second cellular network when the present state of the respective terminal meets the designated condition,
    wherein the present state is a positional condition of each radio communication terminal,
    wherein the second cellular network is different from the first cellular network, and
    wherein forming the multicast group from each terminal of first radio communication terminals belonging to a first cellular network and second radio communication terminals belonging to a second cellular network whose present state meets a designated condition is based only on the positional condition of each respective radio communication terminal meeting the designated condition.

7. The tangible processor-readable medium incorporating the half-duplex radio communication program claimed in claim 6, wherein, in the multicasting step, a closed user group is formed of the first radio communication terminals and the second radio communication terminals whose present state meets the designated condition, and the sender terminal multicasts data to the radio communication terminals registered to the closed user group.

8. The tangible processor-readable medium incorporating the half-duplex radio communication program claimed in claim 7, wherein, in the multicasting step, the present state of each radio communication terminal of the first radio communication terminals and the second radio communication terminals whose present state meets the designated condition is retrieved from all communicable terminals of the first cellular network and the second cellular network and registered in advance with a respective cellular network of the respective terminal to form the closed user group, and the sender terminal acquires a right in half-duplex radio communication to send emergency multicasts to the radio communication terminals registered in the closed user group, even when the radio communication terminals belong to cellular networks other than the cellular network to which the sender terminal belongs.

9. The tangible processor-readable medium incorporating the half-duplex communication program claimed in claim 7, wherein the data for multi-casting includes voice and pictures.

10. The tangible processor-readable medium incorporating the half-duplex radio communication program claimed in claim 6, wherein the data for multicasting includes voice and pictures.

11. A half-duplex communication system connected to communicate with a plurality of cellular networks, including a first cellular network and a second cellular network, the half-duplex radio communication system comprising:
   a radio communication controller for controlling half-duplex radio communication; and
   a first present acquisition section operable to automatically acquire information about a present state of each radio communication terminal belonging to the first cellular network, and a second present state acquisition section operable to automatically acquire information about the present state of each radio communication terminal belonging to the second cellular network,
   wherein, when the radio communication controller accepts an application for multicasting data to a multicast group formed from each terminal of the first and second radio communication terminals whose present state meets a designated condition, the data are multicasted to the multicast group formed from each terminal of the radio communication terminals of the first and second cellular networks whose present state meets the designated condition based on the information about the present states of the radio communication terminals acquired by the respective present state acquisition sections of the first cellular network and the second cellular network under the control of the radio communication controller, and
   wherein the present state is a positional condition of each radio communication terminal;
   wherein the second cellular network is different from the first cellular network, and
   wherein forming the multicast group from each terminal of first radio communication terminals belonging to a first cellular network and second radio communication terminals belonging to a second cellular network whose present state meets a designated condition is based only on the positional condition of each respective radio communication terminal meeting the designated condition.

12. The half-duplex radio communication system claimed in claim 11, wherein each cellular network of the plurality of cellular networks comprises a present state acquisition section.

13. The half-duplex radio communication system claimed in claim 12, wherein, after accepting the application for multicasting, the radio communication controller forms a closed user group from the radio communication terminals meeting the designated condition based on the present state of the respective radio communication terminals from the present state acquisition sections, and multicasts the data from a sender terminal to the radio communication terminals registered to the closed user group.

14. The half-duplex radio communication system claimed in claim 13, wherein the radio communication controller, after accepting the application for multicasting, requests the present state acquisition sections of the cellular networks to retrieve an identity of each radio communication terminal whose present state meets the designated condition from all communicable terminals of the first cellular network and the second cellular network and registered in advance with the cellular network of the respective terminal to form the closed user group, and the sender terminal acquires a right in half-duplex radio communication to send emergency multicasts to the radio communication terminals registered in the closed user group, even when the radio communication terminals belong to cellular networks other than the cellular network to which the sender terminal belongs.

15. The half-duplex radio communication system claimed in claim 13, wherein the data for multicasting includes voice and pictures.

16. The half-duplex radio communication system claimed in claim 11, wherein the data for multicasting includes voice and pictures.

* * * * *